Oct. 24, 1967　　　W. POLLAK ETAL　　　3,348,876
CONVERTIBLE TOP LATCH MECHANISM
Filed Oct. 23, 1965　　　　　　　　　　3 Sheets-Sheet 3
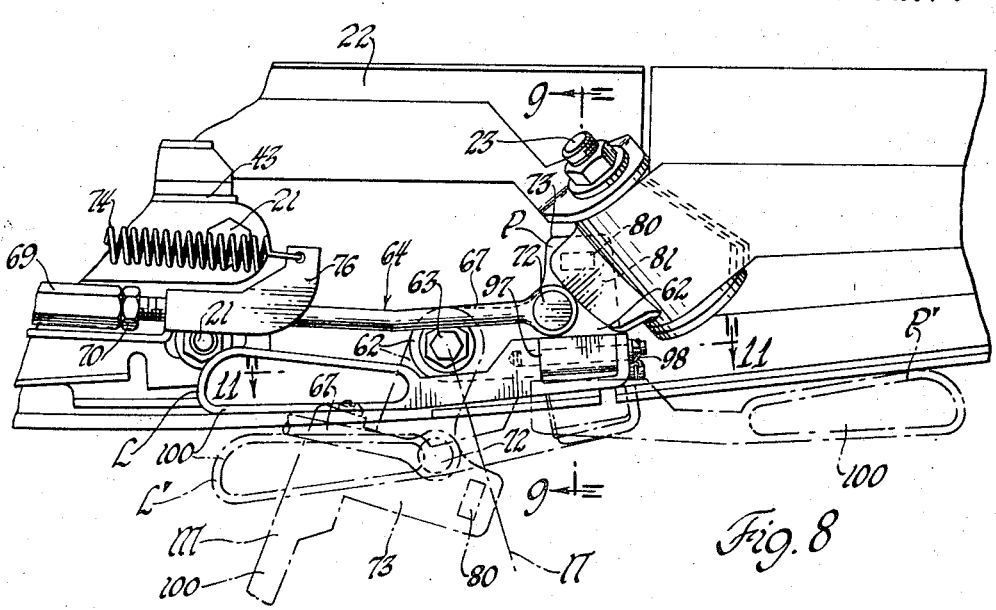
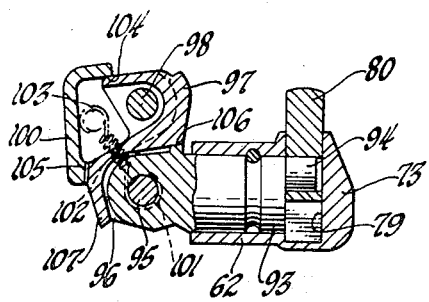
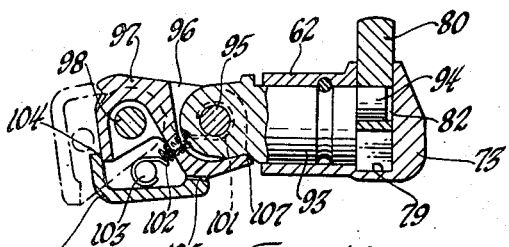
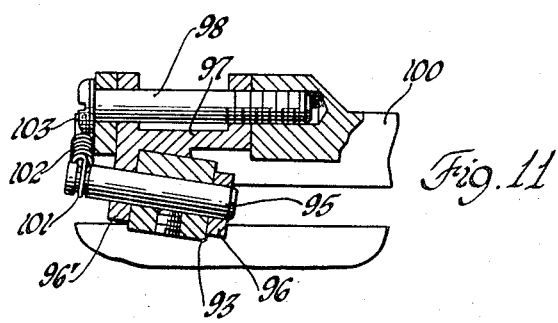
INVENTORS
Walter Pollak, &
BY William E. McLean
Edward E. James
ATTORNEY

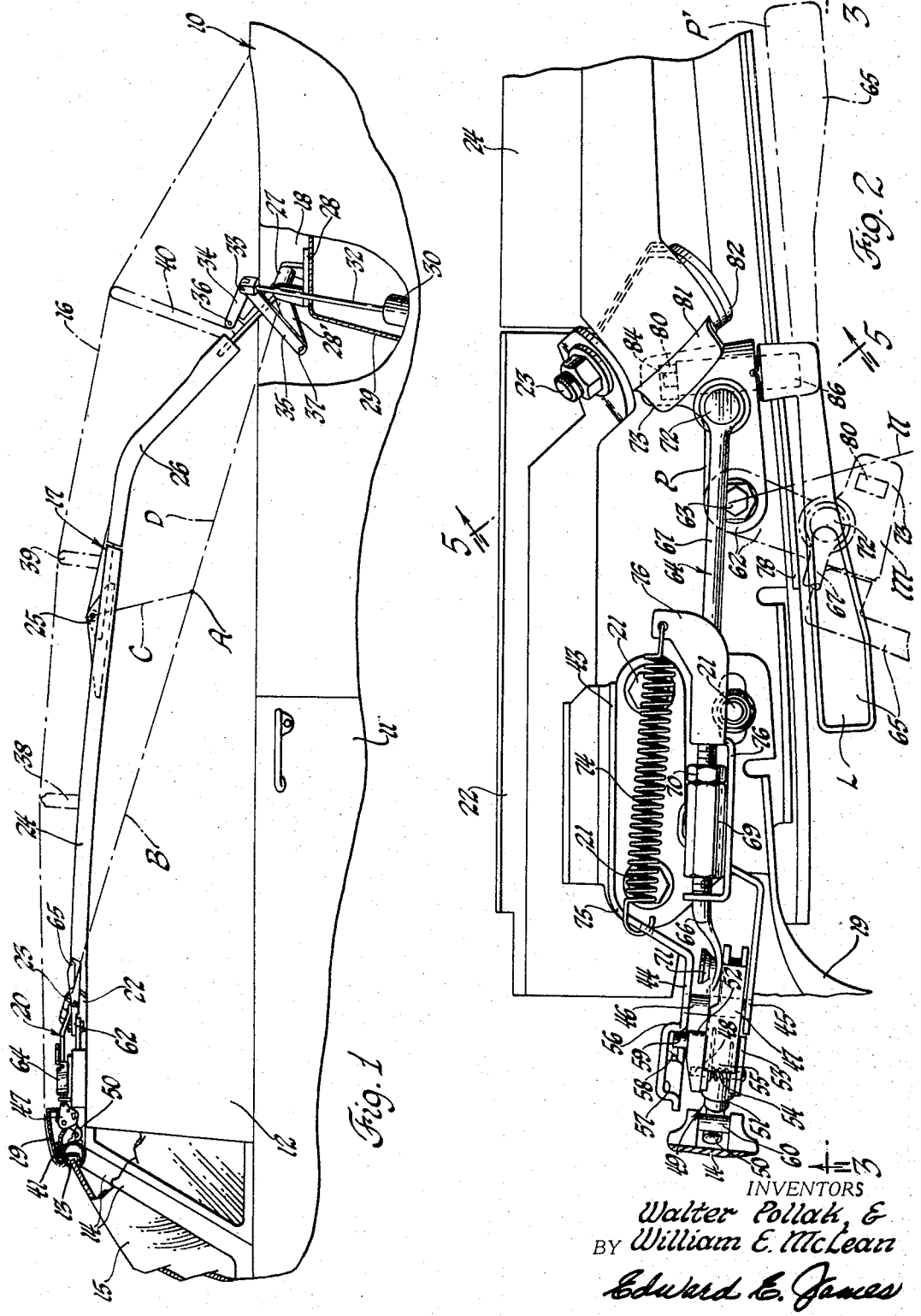

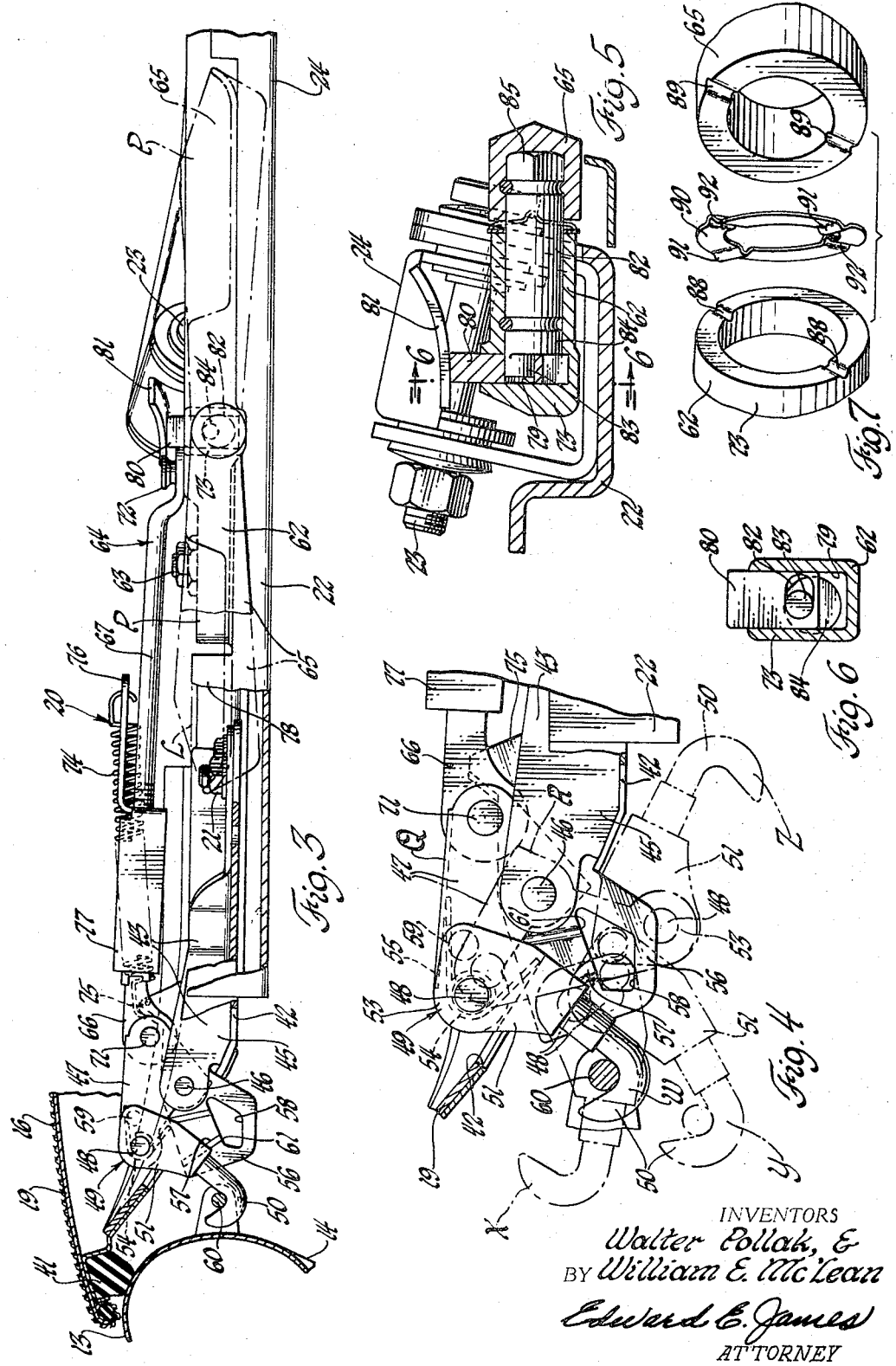

United States Patent Office 3,348,876
Patented Oct. 24, 1967

---

3,348,876
CONVERTIBLE TOP LATCH MECHANISM
Walter Pollak, Detroit, and William E. McLean, Farmington, Mich., assignors to General Motors Corporation, Detroit, Mich., a corporation of Delaware
Filed Oct. 23, 1965, Ser. No. 504,033
5 Claims. (Cl. 296—121)

This invention relates to convertible tops and more particularly to latch mechanisms adapted to latch a top header to a windshield support.

In convertible tops of the inward folding type disclosed in copending application Ser. No. 466,020—Podwys, filed June 22, 1965, the pivots of each of the side rails converge at a single point. When the top is in raised position, relative pivotal movement between the header and the side rails is possible at the pivots between the rearward extensions of the header and these rails It has been proposed to provide header latches wherein a portion of the handle engages the header extensions and the side rails at these pivots in order to lock the pivots when the top is in raised position and prevent any relative movement therebetween. The convertible top latch mechanism of this invention is an improvement of this general type of latch mechanism.

The primary object of this invention is to provide an improved latch mechanism for latching the top header to the top support, the latch mechanism being operable in latched position to selectively lock the pivotal connection between the header and side rail against relative pivotal movement. Another object is to provide such a mechanism having latch operating means which may be selectively locked against movement when the mechanism is in latched position. Still another object is to provide detent means for locating the latch operating means in locked and unlocked positions. Yet another object is to provide latch operating means having an operating member which, in the latch and locked position of the operating member, is movable to a stored position within the header.

These and other objects of the invention will be apparent from the following description of several illustrative embodiments, having reference to the accompanying drawings, in which:

FIGURE 1 is a partial side elevational view of a convertible vehicle body with the fabric top removed and shown in phantom broken lines and shows one side of the foldable top supporting frame linkage fully extended to a raised, passenger compartment enclosing position maintained by a top locking mechanism embodying the invention;

FIGURE 2 is an enlarged fragmentary view showing the mounting and operational interrelationship of the illustrative top locking mechanism in plan elevation relative to the pivotally interconnected ends of the front and forward side rail members;

FIGURE 3 is an enlarged fragmentary view corresponding to the top locking portion of FIGURE 1 and showing the illustrative mechanism in side elevation taken substantially in the direction indicated at 3—3 in FIGURE 2;

FIGURE 4 is a further enlarged view of a portion of FIGURE 3 illustrating different operative positions of the several top latching elements in full and broken lines;

FIGURE 5 is an enlarged fragmentary view sectioned substantially as indicated at 5—5 in FIGURE 2;

FIGURE 6 is a fragmentary sectional view taken substantially in the plane indicated at 6—6 in FIGURE 5;

FIGURE 7 is an exploded fragmentary view showing the detenting means provided in the compound operating lever of the top locking mechanism illustrated in FIGURES 1–6;

FIGURE 8 is a fragmentary plan elevational view similar to a portion of FIGURE 2 and shows an alternative operating lever;

FIGURE 9 is a sectional view further illustrating this alternative form of the invention and is taken substantially in the plane of the line indicated at 9—9 of FIGURE 8;

FIGURE 10 is a sectional view similar to FIGURE 9 and illustrates the handle portion of the compound operating lever of this form of the invention in an extended latch operating and rail interlocking position; and FIGURE 11 is a sectional view taken substantially in the plane indicated at 11—11 of FIGURE 8 and further illustrates the pivotal connections provided between the several elements of the compound operating lever.

Referring more particularly to FIGURE 1, a portion of a convertible vehicle body is indicated generally by the reference numeral 10. Two front doors 11 are suitably hinged to provide access to a body defined passage compartment 12. The invention would be equally applicable, however, to a four-door convertible body. A transverse header 13 and two vertically inclined pillars 14 mount a windshield 15 on the body forwardly of the passenger compartment in a conventional manner. A fabric top indicated in phantom lines at 16 is foldable by an articulated top supporting frame linkage 17 between a raised top closing position and a folded position retracted substantially within a top housing well 18 located behind a rear seat in the passenger compartment. As indicated above, the top supporting frame may be of the type having inwardly folding side rails. The frame illustrated in FIGURE 1 is substantially similar to that shown and described in co-pending United States patent application Ser. No. 466,020, filed June 22, 1965, in the name of Stanley Podwys.

The top supporting frame 17 includes a front rail member 19 which is movable to a raised position proximate windshield mounting header 13. The raised front rail is normally locked in weathersealing engagement with the header by operation of two latch mechanisms 20 constructed in accordance with the invention and mounted on the laterally spaced opposite ends of the front rail member. In the accompanying drawings, only the right-hand side of the top supporting frame and the right-hand latch mechanism are shown in structural and operational detail and the following description is specifically related thereto. It will be apparent, however, that the left-hand portion of the top supporting frame and the left-hand latch mechanism would be of similar construction but of opposite hand. The following description is thus equally applicable to the reversed configurations of the left side of supporting frame and to the left-hand latch mechanism mounted thereon.

As shown in FIGURES 1–3, the laterally spaced opposite ends of the front rail are suitably secured at 21 to relatively short, rearwardly extending stub rail members 22. These two front rail end members are each pivotally hinged at 23 to the forward end of an intermediate side rail member 24. The rear end of each side rail 24 is pivotally hinged at 25 in side-by-side relation to the forward end of a rear side rail member 26. The opposite end of each rear side rail member is angled downwardly from the hinge 25 and is pivotally supported at 27 by a clevis forming bracket 28. The two rear side rail hinging brackets 28 are obliquely and spacedly mounted on a horizontally disposed portion of an angled panel 29 which extends transversely of a vehicle body between the two rear wheel housings, not shown. The angled panel 29 defines the bottom wall of the top well 18 and forms an inclined rear seat back supporting member.

A conventional hydraulic power actuator 30 is mounted rearwardly of the body panel 29. A piston rod 32 extends upper from the hydraulic cylinder of each actuator and is operably connected to swing the adjacent rear side rail member between its retracted and raised top closing positions. In the illustrative embodiments, the upper end of each piston rod 32 extends through a perforation provided in the rear seat panel adjacent each top supporting bracket 28 and is pivotally connected at 33 to a pair of links 34 and 35. The link 34 is pivotally connected at 36 to the adjacent rear side rail member 26 and the link 35 is pivotally connected at 37 to a lateral extension 28' of the top supporting bracket 28. The links 34 and 35 thus serve to translate the piston rod movement imparted to each pivot 33 into appropriate swinging movement of the adjacent rear rail member.

The pivotal axes of the several rail interconnecting hinges 23, 25 and 27 are shown in broken line in FIGURE 1 and designated B, C and D, respectively. To provide the desired inwardly folding side rail movement, these pivotal hinge axes are arranged to converge and intersect at a common point A located inwardly and below the side rails of the raised top supporting frame. To lower the top to its folded or retracted position, the hydraulic actuator 30 is selectively energized to withdraw the piston rod 32 into the actuator cylinder. Such downward movement of the piston rod 32 causes the rear rail member 26 to be swung rearwardly of the body about the obliquely inclined axis D. This in turn causes the front and intermediate side rail members 19 and 24 to be folded with respect to the rear side rail member 26 about the inclined pivotal axes B and C, respectively. The front rail remains substantially parallel to the windshield mounting header and to the body as the top is folded downwardly to its lowered position within the body defined top well. When the actuators 30 are selectively energized to cause reverse upward movement of the piston rods 32, the resultant linkage controlled movement swings the rear side rail members to their raised positions. This rear rail movement causes the intermediate side rail and front rail members to be swung forwardly to their top closing positions about their pivotal interconnections. Several top supporting bows 38, 39 and 40 are pivotally mounted on and extend laterally between corresponding side rail members. These bows are spacedly secured to the undersurface of the fabric top and are swung upwardly to raised top supporting positions during movement of the frame 17 to its top closing position.

The intermediate portion of the front rail member 19 is bowed transversely of the vehicle and mates substantially with the windshield supporting header 13 when its top closed position shown in FIGURES 1 and 3. A resilient weatherseal strip 41 carried by this front rail portion is sealingly and compressively engageable with the windshield header upon locking operation of the laterally spaced top latching mechanisms 20. The angled front rail end portions are perforated at 42 forwardly of the stub rail members and adjacent their cornered juncture with the intermediate portion of the front rail member. The short front rail end members 22 secured to these angled end portions are of stepped channeled section and open upwardly toward the fabric top. In the illustrative embodiment, each latch mechanism 20 is mounted substantially within the stepped channels of the front rail end members and each has a latch member or bolt 50 which extends through the adjacent rail opening 42 and is movable between a retracted striker disengaging position and top locking position in latching engagement with a striker 60 mounted on the adjacent upper corner of the windshield header and pillar.

Each latch mechanism 20 includes a mounting bracket 43. As shown in FIGURES 2 and 3, these brackets are suitably secured for limited adjustment longitudinally of the channeled forward ends of the front rail end members 22. As further shown in FIGURES 2–4, the forward end of each bracket 43 has two laterally spaced upstanding arms 44 and 45. A pivot pin 46 is supported by and extends transversely between these bracket arms above the adjacent front rail opening 42 and pivotally mounts one corner of a folded triangularly-shaped bellcrank lever 47. A pivot pin 48 is mounted in a second forward corner of the lever 47 and forms a lever arm with respect to the pivot pin 46. The pin 48 pivotally mounts a two-piece latch member 49. The bellcrank lever 47 is swingable on the pin 46 between a latch engaging position Q shown in full lines in FIGURES 1–4 and a latch disengaging position carrying the pivot pin 48 to a corresponding position indicated in broken lines at R in FIGURE 4.

The two-piece latch member 49 includes a hook-shaped bolt 50. The shank portion of this bolt member is threadably mounted and longitudinally adjustable in a support member 51. Spaced clevis arms 52 and 53 on the member 51 are pivotally mounted as shown on the projecting ends of the pin 48. A helical spring 54 embraces the pin 48 within the hollow recess of lever 47 and is torsionally interposed as shown between the lever and the bolt supporting member 51. The spring 54 thus tends to bias the latch member 49 in a clockwise, striker engaging direction as viewed in FIGURES 2 and 4 towards an extended position wherein the bolt supporting member 51 engages a transverse fold-over flange 55 formed on the bellcrank lever.

The upstanding arm 44 on the latch mounting bracket 43 extends forwardly and downwardly of the bellcrank mounting pin 46 to form a cam flange 56. This cam flange is normally operable to control swinging movement of the latch member 49 between striker engaging and disengaging positions. A channel or groove 57 formed in this cam flange is spaced laterally from and faces the bellcrank lever 47 and the latch supporting member 51. The channel 57 is open at its upper end and is tapered downwardly of the flange between vertically inclined, converging side walls and terminates downwardly in an enlarged triangularly-shaped cam slot 58. The obliquely inclined bottom surfaces of this cam slot are engageable with a pin 59 carried by the latch member 49. In the illustrative latch mechanism, this cam engaging pin projects laterally from the adjacent clevis arm 52 of the bolt supporting member 51 in spaced parallel relation to the latch pivoting pin 48. Such pin and cam surface engagement normally occurs and controls swinging of the latch member 49 during movement between a retracted striker disengaging position and an initial striker engaging position.

During downward swinging movement of the bellcrank lever 47 from its latch engaging position Q toward its extreme latch disengaging position R, the cam pin 59 normally passes downwardly through the channel 57 until it initially engages the forward bottom surface of the cam slot 58. Further downward swinging movement of the bellcrank lever 47 causes the cam engaged pin 59 to rotate the latch member 49 in a counterclockwise direction against the biasing action of the spring 54 to its extreme latch disengaging position shown in broken lines at Z in FIGURE 4. In this retracted position, the latch bolt 50 is removed from potential engagement with the keeper or striker 60 and the adjacent corner of the windshield header and pillar during opening and closing movement of the top supporting front rail member.

The latch member 49 is normally stored with the folded top in its fully retracted position. During upward clockwise swinging movement of the bellcrank lever 47 after subsequent top raising and closing movement of the front rail member proximate the front windshield member 13, relative movement between the cam slot 58 and the pin 59 permits the spring 54 to rotate the latch member 49 in a clockwise direction from its extreme retracted position Z toward an extended striker engaging position shown in broken lines at Y in FIGURE 4. In approaching this extended lever position, the hook-shaped bolt member 50 normally engages the adjacent keeper or striker 60 as the pin 59 reaches the forward end of the cam slot 58.

After the bolt 50 engages the striker, further upward swinging movement of the bellcrank lever 47 rotates the latch member 49 slightly in a counterclockwise direction. Such rotation of the latch member swings the pin 59 rearwardly and upwardly and permits the pin to pass upwardly through the channel 57 as the bellcrank lever is further actuated to its extreme latch engaging position Q. Such actuation of the bellcrank lever carries the latch member to an extreme top locking position shown in full lines at W in FIGURE 4. The clamping forces thus exerted through the two laterally spaced latch members are sufficient to compressively seal the weatherstrip between the windshield header 13 and the front rail 19 under all normal vehicle operative conditions.

In some cases, latching engagement with the striker 60 may not occur as the latch member approaches and reaches its initial striker engaging position Y. Such latching failure may be due to incomplete closing or lateral misalignment of the front rail with respect to the windshield header. If this occurs, further upward swinging movement of the bellcrank lever swings the latch lever cam pin 59 upwardly into blocking engagement with an overhanging detent shoulder 61 formed on the cam flange 56 by the forward end of the cam slot 58 and the forward side wall of the channeled groove 57. Such pin blocking engagement is indicated at X in FIGURE 4 and tends to prevent further latch engaging movement of the bellcrank lever and the latch operating linkage until the latch member has been returned to a retracted position and the front rail has been brought into proper engagement and alignment with the windshield header.

As best shown in FIGURES 2 and 3, a latch operating lever 62 is pivotally mounted at 63 rearwardly of the front rail end member 22 and is operably connected by an adjustable link 64 for swinging actuation of the bellcrank lever 47 between its extreme latch engaging and disengaging positions. The operating lever 62 is thus journaled for horizontal swinging movement between an extreme latch disengaging position M shown in broken lines in FIGURE 2 and an extreme latch engaging position P. These extreme positions of the latch operating lever correspond to the latch disengaging and engaging positions R and Q, respectively, of the bellcrank lever. When actuated to its latch disengaging position M, the operating lever and a latch operating handle 65 rotatably mounted thereon extend transversely of the side rail and project inwardly of the passenger compartment. In its latch engaging position P, the latch operating lever 62 is retracted substantially within the confines of the front rail end member and the handle 65 extends rearwardly in spaced parallel relation to the adjacent side rail. During movement between its extreme positions, the operating lever 62 passes through an intermediate position N corresponding to the striker engaging or detent blocking position of the latch member.

The opposite end portions 66 and 67 of the link 64 are threadably interconnected and adjustable by a turnbuckle nut 69. This turnbuckle nut is normally maintained in an adjusted position by a locking nut 70. The distal ends of the link portions 66 and 67 are angled or normally disposed with respect to each other so as to translate the horizontal swinging movement of the operating lever 62 between its latch engaging and disengaging positions into corresponding vertical swinging movement of the bellcrank lever. The angled opposite ends of the link portions 66 and 67 are loosely pivoted on headed studs or pins 71 and 72 which are secured to and project, respectively, from the upper rear corner of the bellcrank lever 47 as viewed in FIGURE 3 and from the operating lever 62 in spaced parallel relation to its pivotal mounting at 63. The axial and radial clearances provided between the angled link ends and the pivot studs 71 and 72 are sufficient to permit limited universal movement therebetween.

The pivot stud 72 is so located in its mounting on the operating lever that the line of action of the connecting link 64 passes slightly overcenter of the pivotal axis of the lever mounting stud 63 upon manual actuation of the operating lever to its latch engaging position shown in full lines in FIGURES 1–3. In this overcenter position of the operating lever, the inter-engaged latch bolt and striker maintain the sealing pressures required between the windshield header 13 and the front rail mounted weatherstrip 41. The top locking force thus applied to each latch lever 49 is transmitted to the bellcrank lever 47 and acts through the link 64 and the slightly overcenter pivot stud 72 to bias and maintain the operating lever 62 in its retracted latch engaging position wherein an arm 73 extending laterally of the operating lever abuts the adjacent rail hinging bolt 23.

As shown in the illustrative latch mechanism, a spring 74 is tensively interposed between an upstanding flange 75 formed on the rail mounted bracket 43 and an adjustable spring seating flange 76 extending rearwardly of a turnbuckle bracket 77. This bracket is threadably mounted as shown on the link end portions 66 and 67 for spring tensioning adjustment. Such bracket adjustment may be effected independently or simultaneously with link adjusting rotation of the turnbuckle nuts 69 and 70. The spring seating flanges 75 and 76 are so located that the line of action of the spring 74, as applied to link 64, passes overcenter of the operating lever pivot 63 during initial bolt and striker engagement. The overcenter spring 74 then acts through an increasing moment arm to assist actuation of the operating lever and of the connected latch elements to their extreme latch engaging, top locking positions. The turnbuckle adjustable spring 74 further cooperates with the overcenter biasing action of the link 64 to provide and maintain the top sealing and locking forces required between the windshield header and the front rail of the top.

During actuation of the operating lever in a clockwise direction as viewed in FIGURE 2, the spring 74 passes overcenter of the pivot 63 and thereafter biases the operating lever toward its latch disengaging position. This overcenter spring-biased movement of the operating lever swings the bellcrank lever 47 downwardly to its extreme position R wherein the latch member 49 is fully retracted by cooperative engagement between the cam pin 59 and the cam slot 58. Depending on the turnbuckle adjusted length of the link 64, the extreme latch disengaging position of the operating lever may be alternately determined by the fully retracted position of the latch member or by limiting engagement with a flanged edge 78 on the latch mounting rail member 22.

As best shown in FIGURES 5 and 6, a rail locking member or pawl 80 is slidably mounted at 79 in the end of the operating lever arm 73 distal from the pivot 63. The pawl 80 is drivingly connected to the latch operating handle 65 for actuation between a retracted rail unlocking position and a raised rail locking position. The raised pawl normally effects lost-motion take-up and rail locking engagement with an overlying flange 81 formed on the hinged forward end of the adjacent intermediate rail 24.

In the illustrative embodiment, a transverse slot 82 in the pawl 80 engages a driving eccentric 83 formed on a spindle 84 journaled in the lever arm 73. The spindle projects outwardly of the lever 62 and is drivingly splined and connected at 86 to the hub end of the operating handle 65. The spindle embracing end surface of the arm 73 and the opposing face of the handle hub are intersected by diametrically paired notches 88 and 89, respectively. An annular detent spring 90 is interposed between these notched surfaces. This spring is diametrically crimped at 91 for spring retaining insertion within the notches 88 of the latch operating lever. The spring is oppositely and less sharply crimped to form diametrically disposed detents 92. These detents are axially deflectable and slidably engageable with the notched end surface of the handle hub. The spring detents 92 are thus adapted to engage the detent notches 89 of the hub and thereby retain the handle 65 either in a latch operating position with respect to the lever 62, as indicated in phantom lines in FIGURES 2 and 3, or in an extreme top locking position L shown in full line.

Referring now to FIGURE 3, it will be seen that the top locking pawl 80 is withdrawn from lost-motion take-up and locking engagement with the overlying hinge flange 81 when the handle 65 is rotated in a counter-clockwise direction from its forwardly extending, top locking position L to its rearwardly extending, latch operating position indicated in phantom lines at P'. The detent maintained handle may then be used to swing the latch operating lever 62 in a clockwise direction, as viewed in FIGURE 2, between its latched position P and its latch releasing position M. As indicated above, latch releasing movement of the lever 62 swings the bellcrank lever 47 forwardly and downwardly toward its position R thereby sequentially disengaging and withdrawing the latch bolt 49 with respect to the pillar-mounted striker 60.

During movement of the latch operating lever and handle as a unit toward their latched positions P and P', respectively, the cam restrained bolt 49 is spring biased toward its initial striker engaging position Y and is then carried to its fully latched postion W as the cam pin 59 passes upwardly through the channel of the cam flange 56. If striker engagement fails to occur for any reason, the cam pin 59 engages the detent toe 61 on the cam flange. Such bolt retaining engagement prevents further latch operating movement of the handle and lever 62 beyond their blocked intermediate position N. The latch disengagement indicated by such blocking requires that the handle be returned manually or released to permit spring biased return of the lever 62 to its position M. The spring biased bolt 49 is thus cammed to its retracted position. Proper alignment may then be effected between the rail mounted bolts and the windshield pillar mounted strikers.

When latching engagement has been effected between the bolt and striker, the handle 65 is then rotated in a clockwise direction as viewed in FIGURE 3 to its forwardly extending rail locking position L. Such handle rotation of the eccentric spindle 82 shifts the pawl 80 upwardly into take-up driving engagement with the overlying hinge flange 81. As the pawl and handle approach their rail locking positions, the spindle driven pawl acts between the hinged rail members 22 and 24 and takes up any lost motion in the side rail linkage.

Except for the pawl driving spindle and the latch operating handle, the elements of the alternative top locking mechanism shown in FIGURES 8-11 are structurally and operationally similar to those of the first embodiment and are identified by like reference numerals. In the alternative mechanism, a latch operating handle 100 is mounted on the projecting end of the eccentric spindle 93 by an overcenter spring biased link 97. The handle is thus swingable between a retracted position L above the stub rail 22 as shown in full lines in FIGURE 8 and an extended operative position with respect to the spindle and latch operating lever 62. As in the previously embodiment, an eccentric 94 on the spindle 93 drivingly engages and actuates the rail locking pawl 80 in accordance with rotation of the handle about the axis of the spindle.

As best shown in FIGURES 9, 10 and 11, a pin 95 is carried by the inwardly projecting end of the spindle 93 and extends transversely of the pawl driving eccentric. This pin pivotally mounts spaced clevis arms 96 and 96' on the link 97. A bolt 98 pivotally secures the handle 100 on link 97 in spaced relation to the pin 95.

The spaced axes of the pivot pin 95 and bolt 98 are preferably inclined, however, as shown in FIGURE 11. The extended downwardly folded handle may thus be rotated without interference with the side rails 22 and 24 during actuation between its intermediate rail locking and header latching positions which are shown in phantom lines in FIGURE 8 at L' and P', respectively.

As best shown in FIGURE 11, a projecting end of the pivot pin 95 is circumferentially grooved at 101. An overcenter spring 102 is tensively interposed between this grooved end of the pin 95 and a stud 103 projecting from the adjacent end of the handle. When the handle 100 is in its retracted position L as shown in FIGURE 9, the overcenter action of the spring 102 maintains the handle in abutment at 104 and 105 with the link 97. The link is in turn maintained in overcenter limiting abutment with the spindle at 106. When the handle is pulled inwardly and downwardly of the top from its retracted position, it may be initially rotated with respect to the link 97 and the pivot bolt 98. Such handle movement rotates the link downwardly to an extended operative position best shown in FIGURE 10 wherein a limit toe 107 on the link abuts the spindle 93. After such abutment occurs, the overcenter action of the spring 102 rotates the handle into engagement with the link at 104 and 105 and thereafter tends to maintain the handle and link in their extended positions for sequential operation of the pawl driving spindle and the latch operating lever in the manner previously described.

It will be apparent that various changes and modifications might be made in the structure and form of the illustrative top locking mechanisms without departing from the spirit and scope of the invention as defined in the following claims.

We claim:

1. In combination with a vehicle body having a convertible top movable between raised and lowered positions relative to a top support, the top including a header member, a side rail member pivoted to the header member, latch means mounted on one of the members and movable between latched and unlatched positions to selectively latch the header member to the top support, and latch operating means movable between first and second positions to selectively move the latch means between unlatched and latched positions, the improvement comprising cooperating means on the latch means and on the other member movable between locked and unlocked positions to selectively lock the side rail member and the header member together against relative pivotal movement, actuating means on the latch operating means operable in the second position thereof to selectively move the cooperating means between locked and unlocked positions and means preventing movement of the latch operating means to first position when the cooperating means are in locked position.

2. The combination of claim 1, wherein the cooperating means include first locking means mounted on the side rail adjacent the pivotal interconnection and second locking means mounted on the latch operating means and selectively movable into engagement with the first locking means by the actuating means to lock the side rail member and the header member together against relative piovtal movement.

3. The combination of claim 2, wherein the latch operating means include an operating link connected to the latch means and pivoted to the header and the actuating means include an operating member pivoted to the link, the link and operating member being pivotable as a unit between first and second positions to effect header unlatching and latching, the operating member being pivotable relative to the link from second position to a third position to move the second locking means into engagement with the first locking means.

4. The combination of claim 3, wherein the latch operating means include detent means for positioning the operating member in second and third positions.

5. The combination of claim 2, wherein the latch operating means include an operating link pivoted to the header, and the actuating means include an intermediate link pivoted to the operating link and an operating member pivoted to the intermediate link, and the second locking means are reciprocably mounted on the operating link for movement into and out of engagement with the first locking means, the operating member and links being pivotable as a unit between first and second positions to effect header unlatching and latching, the operating member and intermediate link being pivotable as a unit relative to the operating link in second position to a third position to move the second locking means into engagement with the first locking means, the operating member being pivotable relative to the intermediate link in third position to a stored inoperative position within the header member.

References Cited
UNITED STATES PATENTS

| | | | |
|---|---|---|---|
| 2,860,913 | 11/1958 | Kuiper et al. | 296—107 |
| 3,129,025 | 4/1964 | Krueger. | |
| 3,146,022 | 8/1964 | Zeller | 296—116 |
| 3,216,763 | 11/1965 | Heincelman | 296—121 |
| 3,266,838 | 8/1966 | Heincelman | 296—121 |

LEO FRIAGLIA, *Primary Examiner.*

C. C. PARSONS, *Assistant Examiner.*